No. 710,414. Patented Oct. 7, 1902.
J. H. BICKFORD.
CONTROLLING DEVICE FOR ELECTRIC GENERATORS.
(Application filed Mar. 19, 1900.)
(No Model.)
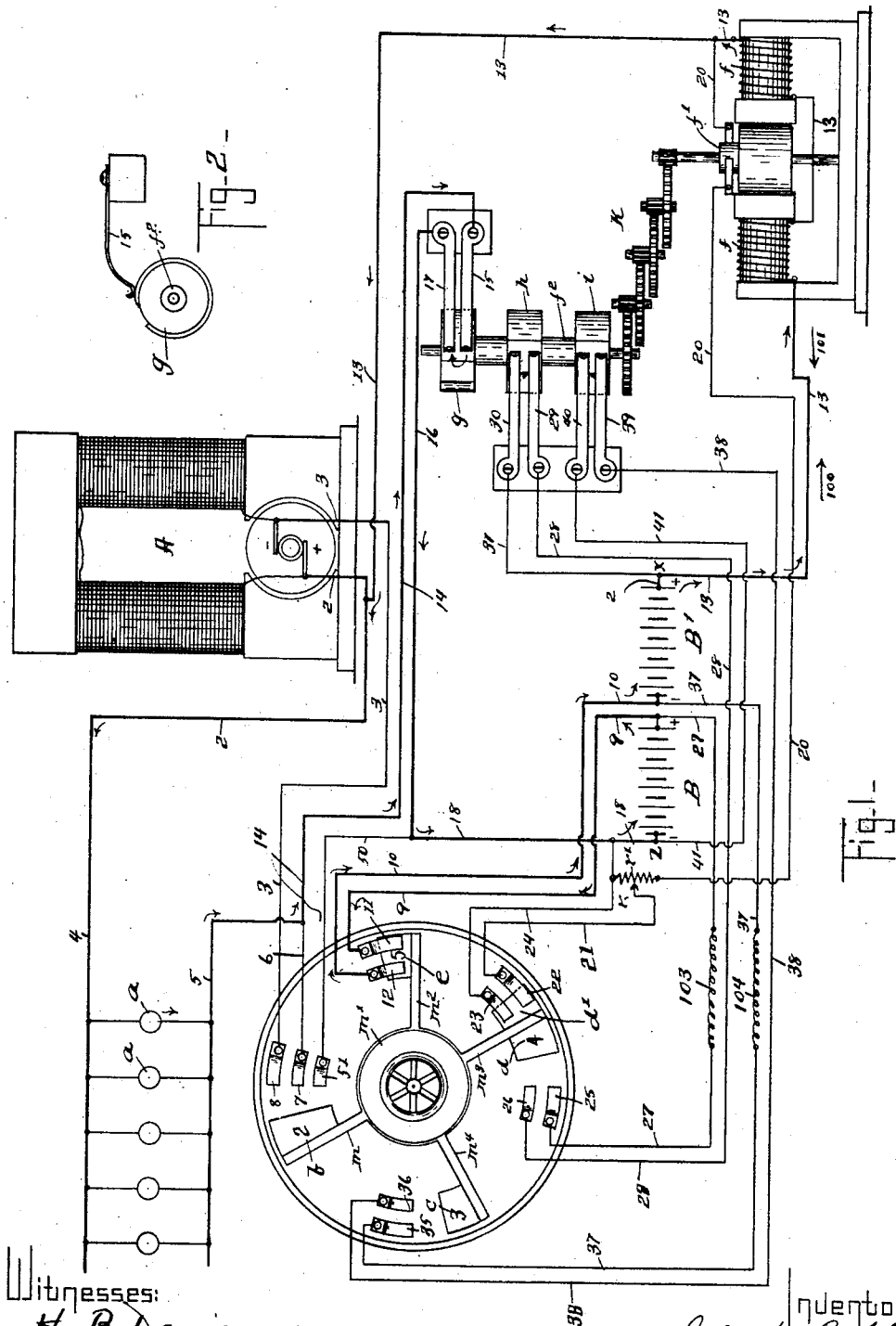

UNITED STATES PATENT OFFICE.

JOHN H. BICKFORD, OF SALEM, MASSACHUSETTS.

CONTROLLING DEVICE FOR ELECTRIC GENERATORS.

SPECIFICATION forming part of Letters Patent No. 710,414, dated October 7, 1902.

Application filed March 19, 1900. Serial No. 9,283. (No model.)

*To all whom it may concern:*

Be it known that I, JOHN H. BICKFORD, of Salem, county of Essex, and State of Massachusetts, have invented an Improvement in Controlling Devices for Electric Generators, of which the following description, in connection with the accompanying drawings, is a specification, like characters on the drawings representing like parts.

This invention relates to controlling devices for electric generators, and is especially adapted for use where a dynamo and a storage battery (herein called an "electric generator") are both provided for operating an electric circuit containing one or a number of translating devices and either one of said generators used exclusively of the other to supply current to said translating devices; and the invention has for its object to provide means whereby the dynamo may be employed to charge the storage battery, preferably while also employed in supplying current to said translating devices, and also to provide automatic means whereby overcharging or overdischarging the said storage battery is prevented.

In carrying out this invention means are provided for switching either the dynamo or the storage battery in circuit with the translating devices in such order that either one may work exclusively of the other to supply the current for operating said translating devices, the cells of the storage battery at such time being used in series. When using a dynamo and a storage battery for the purpose of doing the same work, it is of course necessary that the potential of both should be the same, yet it is well known that a dynamo will not charge a storage battery of equal potential while the cells of said storage battery are connected in series. Hence two storage batteries are herein provided, which are connected in series when employed to operate the circuit containing the translating devices and which are connected in parallel with said dynamo when being charged and a sufficient resistance added to the charging-circuit to properly reduce the voltage when the dynamo is operating to charge the storage battery thus connected with it, although the dynamo is or may be also supplying current to the translating devices at the same time. Automatic means are also employed for preventing overcharging and overdischarging the storage battery, which consists, essentially, of current-actuated circuit-operating devices which operate to open the circuits at the end of a predetermined number of watt hours or when a predetermined number of watts have passed through it during any interval of time, and for simplicity of construction and convenience in operation the same current-actuated motor is employed for operating the circuit-operating devices for the purpose of accomplishing both results, it operating reversely—*i. e.*, operating in one direction to operate the circuit-operating devices to open the circuits and prevent overcharging the storage battery and also at the same time restoring the circuit-operating device which is employed for preventing overdischarging said storage battery, and operating in the opposite direction to operate said circuit-operating device to open the circuit and prevent overdischarging said storage battery and also at the same time restoring the circuit-operating devices which are employed for preventing overcharging the storage battery.

Figure 1 shows in diagram an electric circuit having a number of translating devices, a dynamo and two storage batteries for operating said circuit, and switches for connecting either said dynamo or storage batteries with said circuit to supply current thereto and for connecting said storage batteries in circuit with the dynamo when disconnected from the circuit containing the translating devices, said switches preferably operating simultaneously, and current-actuated circuit-operating devices for preventing overcharging and overdischarging said storage batteries, the parts being represented in the drawing as having the storage batteries connected in series with the circuit containing the translating devices and the dynamo as disconnected from said circuit; Fig. 2, a detail of one of the circuit-operating devices, which is operated by the current-actuated motor.

A represents the dynamo, which may be of any ordinary type, and 2 3 the circuit-wires leading therefrom. The circuit-wire 2 leads directly to the wire 4 of the circuit 4 5, containing one or any number of translating devices *a*—such, for instance, as electric lamps— and the wire 5 of said circuit is connected to a wire 6, which in turn is connected to a plate 7 of a switch. The wire 3 from the dynamo A leads directly to the plate 8 of said switch, and $b$ represents the movable member of said switch, which is adapted to engage said plates 7 and 8 or disengage them, as the case may be. When said switch is closed, it will be seen that the dynamo is connected with the circuit 4 5, containing the translating devices $a$, the circuit being as follows: 2, 4, $a$, 5, 6, 7, $b$, 8, and 3. The member $b$ of the switch is attached to an arm $m$, radiating from a hub $m'$, which is adapted to be turned by hand or otherwise, and from said hub $m'$ a number of other arms radiate, as $m^2$ $m^3$ $m^4$, which bear the movable members of other switches, as will be described, so that as said hub is turned all of the switches may be simultaneously operated.

Two storage batteries are herein shown, as B B', adapted to be connected either in series or in parallel, as will be described, although, so far as this invention is concerned, any other number of batteries may be employed. The batteries B B' when connected in series of course really serve as and constitute a single storage battery. It is the intention to connect the batteries B B' in series with the circuit 4 5, containing the translating devices, and when disconnected therefrom (electrically or otherwise) to connect the same in parallel with the dynamo-circuit 2 3, so that in the first instance said storage batteries B B' will serve as a single storage battery to supply current to said translating devices exclusively of the dynamo, and in the second instance said batteries will be in proper connection with the dynamo-circuit to be charged at the same time that said dynamo is supplying current to said circuit 4 5, containing the translating devices.

It will be understood that both the dynamo and storage batteries are adapted to supply current to the circuit 4 5, each exclusively of the other, and as they are intended to perform the same work it is necessary that they should be of the same potential, and consequently it becomes necessary to use two storage batteries and to connect them in parallel with the charging-circuit whenever it is desired to charge the battery by means of a dynamo having a potential equal to the potential of said batteries when the latter are connected in series.

9 represents a wire leading from the positive pole of the storage battery B, and 10 represents a wire leading from the negative pole of the storage battery B', and said wires 9 and 10 lead to two plates 11 and 12 of a switch which is adapted to be closed by the movable member $e$ on the arm $m^2$, and when said switch is closed, as shown in the drawings, the two storage batteries B and B' will be connected in series, and when said switch is open the series connection thus described will be broken.

13 represents a wire leading from the positive pole of the storage battery B', which includes the field-magnets $f$ $f$ of a current-actuated motor employed for operating certain circuit-operating devices, to be hereinafter described, and said wire as connected directly with the dynamo circuit-wire 2, leading to the wire 4 of the circuit containing the translating devices, and a wire 14 leads from the wire 5 of said circuit 4 5 to one of the contact-pens 15 of one of said circuit-operating devices, and a wire 16 leads from the other contact-pen 17 of said circuit-operating device to a wire 18, which is connected with the negative pole of the storage battery B. Thus when the switch $e$ 11 12 is closed, as shown in the drawings, the storage batteries will be connected in series with the circuit 4 5, containing the translating devices, the circuit being as follows: 13, 2, 4, $a$, 5, 14, 15, 17, 16, 18, B, 9, 11, $e$, 12, 10, B'. The switch $b$ 7 8 is open at such time, as shown in the drawings, and the dynamo electrically disconnected from the circuit 4 5. The current-actuated motor consists, essentially, of the field-magnets $f$ $f$ and a rotatable armature $f'$, and a number of circuit-operating devices, as will be described, are secured to a shaft $f^2$, which is connected by gearing $k$ with said armature $f'$ and adapted to be operated by it. The field-magnets $f$ $f$ of said motor are included in the aforesaid wire 13. As the circuit-operating devices are operated by the motor, they will be referred to as "current-actuated circuit-operating devices." A wire 20 leads from the wire 13 to the movable member $r$ of a variable resistance $r'$ and includes the armature $f'$ of the motor, and a wire 21 leads from said pivot of the arm $v$, which is connected to a plate 22, with which coöperates a plate $d'$ on the arm $m^3$, and said plate $d'$ also coöperates at the same time with a plate 23, from which a wire 24 leads to the wire 18, so that at the same time that the circuit of the field-magnets $f$ $f$ is connected with the circuit 4 5 the circuit including the armature $f'$ will also be closed, so that a part of the current will traverse the coil of said armature, and consequently the current-actuated motor $f$ $f$ $f'$ will be operated. The variable resistance $r'$ is connected in between the wires 20 and 24, (or 18,) and when the switch $d'$ 22 23 is closed said resistance is shunted out; but when said switch is opened said resistance is included. The function of one of the current-actuated circuit-operating devices is to prevent overdischarging the storage battery, and to accomplish this result a disk $g$ is secured to the shaft $f^2$, which is revolved by the armature $f'$ and which coöperates with the contact-pens 15 17 and is adapted to open the circuit at a predetermined time—for example, at the end of one complete revolution—and said disk $g$ is made of a suitable diameter, and the gearing provided between the armature $f'$ and the shaft $f^2$ is such that said disk will complete its revolution at the end of a predetermined number of watt hours, being regulated by the speed of the armature $f'$, which is in turn regulated by the output of the battery. When the storage batteries have been connected in series with the circuit 4 5, as shown, for a predetermined number of watt hours, the disk $g$ will be brought into position to open the circuit and further flow of current to the circuit 4 5 will cease, and as a result overdischarging the batteries will be prevented. The disk $g$ (see Fig. 2) is herein shown as a circular block of insulating material having mounted upon it a metallic band, the ends of which terminate a short distance apart, so as to leave a suitable space between said ends, and the contact-pens 15 17 bear upon this metallic band when maintaining continuity of the circuit; but when the opening in the band on moving the block $g$ is brought into position beneath said contact-pens 15 17 the circuit will be broken. Thus it will be seen that the circuit-operating device $g$ 15 17 is operated by the current-actuated motor $f$ $f$ $f'$ and will open the circuit at the end of a predetermined number of watt hours. To rest or restore the disk $g$ to its normal position, rotary movement of the shaft $f^2$ is reversed by means to be described, and during the time that said disk $g$ is thus being restored to its normal position the contact-pens 15 and 17 will continue to bear upon it, yet the loop 14 16 will be shunted by the switch 7 $b$ 51, so that the storage battery is still electrically disconnected from circuit 4 5. To rotate the shaft $f^2$, bearing the disk $g$, first in one and then in the opposite direction, I have provided suitable means whereby the armature $f'$ of the motor is rotated first in one and then in the opposite direction, and this is accomplished by passing the current through the coils of the field-magnets in opposite ways, while at the same time passing the current through the coils of the armature in the same direction—i. e., when the storage battery is connected with and supplying current to the circuit 4 5 the current passes over the wire 13 in the direction of the arrow 100 and the disk $g$ is revolved in one direction to open the circuit at $g$ 15 17 at the end of a predetermined number of watt hours, and thereby prevent overdischarging said storage batteries, and to revolve said armature in the opposite direction the current passes over wire 13 in the direction of the arrow 101.

As before stated, it is intended that the storage batteries shall be charged by the dynamo A at the same time that said dynamo is connected with the circuit 4 5, and consequently the two storage batteries are connected in parallel with the dynamo-circuit 2 3 when the dynamo is connected with the circuit 4 5, said storage batteries being at such time electrically disconnected from the circuit 4 5, and to accomplish this result the switch $b$ 7 8 is closed, thereby connecting the dynamo with the circuit 4 5 and shunting the loop 14 16, and the switch $e$ 11 12 is opened, thereby breaking the series connection between the storage batteries B B', and the switch $d$ 22 23 is also opened, breaking the shunt for the resistance $v'$; yet at the same time the switch-plate $d$ on the arm $m^3$ engages the plates 25 26, and the switch-plate $c$ on the arm $m^4$ engages the plates 35 36, and said switches $d$ 25 26 and $c$ 35 36 operate to connect the two batteries in parallel with the dynamo-circuit. A wire 27 leads from the positive pole of the battery B to the plate 25, which includes a suitable resistance 103, and a wire 28 leads from the plate 26 to the contact-pen 29, bearing on the disk $h$, on which also bears the contact-pen 30, which is connected by wire 31 with wire 13, which joins wire 2, leading from the positive pole of the dynamo A. A wire 37 leads from the negative pole of the battery B' to the plate 35, which includes a suitable resistance, and a wire 38 leads from the plate 36 to the contact-pen 39, bearing on the disk $i$, on which also bears the contact-pen 40, from which a wire 41 leads to the wire 18, thence to the wire 3, leading from the negative pole of the dynamo. The disks $h$ and $i$ are constructed substantially the same as the disk $g$, being composed of a circular block of insulating material upon which is mounted a metallic band, the ends of which terminate a short distance apart to provide a short space between them. Parallel connection of the two batteries B B' with the dynamo-circuit will be established as follows: starting at the positive pole of the dynamo, 2, 13, $f$, $f$ to $x$ and from $x$ to the positive pole of the battery B' and also from $x$ by 31, 30, $h$, 29, 28, 26, $d$, 25, 27 to the positive pole of the battery B, and starting at the negative pole of the dynamo, 3, 8, $b$, 51, 50, 18 to $z$ and from $z$ to the negative pole of the battery B and also from $z$ by 41, 40, $i$, 39, 38, $c$, 35, 37 to the negative pole of the battery B. When the dynamo is thus connected in circuit, the wire 20, which includes the armature $f'$, connects the wire 13 with the wire 18 and includes the variable resistance $r$ $r'$. At such time the dynamo-circuit 2 3 serves as and constitutes the charging-circuit for the storage battery, and the current from said charging-circuit passes through the coils of the field-magnets $f$ $f$ in the direction of the arrow 101, being in a direction opposite to the flow of current from the storage battery when the latter is connected with the circuit 4 5, and consequently the armature $f'$ will be rotated in the opposite direction. As the armature is thus rotated in the opposite direction the circuit-breaking disk $g$ will be reset or restored to its normal position, and as the loop-circuit 14 16 is closed or shunted by the switch $b$ 7 51 during such time the closed connection of the contact-pens will produce no effect. Also as the armature $f'$ is thus rotated the circuit-breaking disks $h$ and $i$ will be turned until the breaking-spaces arrive in position beneath the contact-pens, when the circuits will be opened and the flow of current from the charging-circuit 2 3 cease; yet the dynamo may still continue to operate the circuit 4 5. It is well known that the number of watt hours required to charge the storage battery is greater than the number of watt hours given out in discharging it, and consequently it is necessary that the speed of the armature $f'$ shall be greater when the storage battery is discharging than when it is being charged, and hence the employment of the resistance $r\ r'$, which is preferably variable, and it will be seen that when the storage batteries are connected in series with the circuit 4 5 and said batteries thus employed to supply current thereto the resistance $r'$ is shunted out by the switch $d'$ 22 23 and the armature will rotate at its maximum speed; but when said storage batteries are connected in parallel with the charging-circuit 2 3 said switch $d'$ 22 23 will be opened and the resistance $r\ r'$ included, and the speed of the armature will be correspondingly decreased. The resistances in the circuit-wires 27 37 are provided for the purpose of reducing the potential or voltage of the charging-circuit 2 3 when the storage battery is being charged.

I do not desire or intend to limit my invention to the construction herein shown of the several parts, as it is obvious that the same may be modified in many respects without departing from the spirit and scope of this invention.

I claim—

1. An electric circuit containing one or a number of translating devices, a dynamo and means for connecting it with said circuit, two storage batteries and means for connecting them in series with said circuit exclusively of the dynamo, and means for connecting said storage batteries in parallel with said dynamo and a resistance adapted to be introduced when said storage batteries are thus connected in parallel with the dynamo, substantially as described.

2. An electric circuit containing one or a number of translating devices, a dynamo and two storage batteries connected in series, a multiple switch for connecting either said dynamo or said storage batteries with said circuit to supply current for operating the translating devices and also for connecting said storage batteries in parallel with said dynamo when disconnected from the circuit containing the translating devices, substantially as described.

3. An electric circuit containing one or a number of translating devices, a dynamo and two storage batteries connected in series, a multiple switch for connecting either said dynamo or said storage batteries with said circuit to supply current for operating the translating devices and also for connecting said storage batteries in parallel with said dynamo when the dynamo is connected with the circuit containing the translating devices and said storage battery is disconnected therefrom, substantially as described.

4. An electric circuit containing one or a number of translating devices, a dynamo and two storage batteries, means for connecting said storage batteries in series with said circuit to supply current for operating the translating devices and for simultaneously disconnecting the dynamo, and means for connecting the dynamo with said circuit to supply current for operating the translating devices and for simultaneously disconnecting the storage batteries therefrom and for also connecting said storage batteries in parallel with said dynamo, substantially as described.

5. An electric circuit, a storage battery for operating it, means for charging said storage battery and automatic means for preventing overcharging said storage battery consisting of a current-actuated circuit-operating device connected in the charging-circuit which operates at the end of a predetermined number of watt hours to disconnect said storage battery from the charging-circuit, substantially as described.

6. An electric circuit, a storage battery for operating it, and automatic means for preventing overdischarging said storage battery consisting of a current-actuated circuit-operating device adapted to be connected in the battery-circuit which operates at the end of a predetermined number of watt hours to disconnect said storage battery from said circuit, substantially as described.

7. An electric circuit containing one or a number of translating devices, a storage battery for operating it, means for charging said storage battery, and automatic means for preventing overcharging and overdischarging said battery consisting of reversible circuit-operating devices operated by a current-actuated motor, operating in one direction to disconnect said storage battery from the circuit containing the translating devices at the end of a predetermined number of watt hours, and when operated in the opposite direction to disconnect said storage battery from the charging-circuit at the end of a predetermined number of watt hours, substantially as described.

8. An electric circuit, a storage battery for operating it, means for charging said storage battery, and automatic means for preventing overcharging and overdischarging said battery consisting of circuit-operating devices operated by a reversible current-actuated motor, to disconnect said storage battery from said electric circuit at the end of a predetermined number of watt hours when said motor rotates in one direction, and to disconnect said storage battery from the charging-circuit at the end of a predetermined number of watt hours when said motor rotates in the opposite direction, substantially as described.

9. An electric circuit containing one or a number of translating devices, a storage battery for operating it, means for charging said storage battery, and automatic means for preventing overcharging and overdischarging said battery consisting of reversible circuit-operating devices operated by a reversible current-actuated motor, operating in one direction to disconnect said storage battery from the circuit containing the translating devices at the end of a predetermined number of watt hours, and when operated in the opposite direction to disconnect said storage battery from the charging-circuit at the end of a predetermined number of watt hours, substantially as described.

10. An electric circuit, a storage battery for operating it, means for charging said storage battery, and means for preventing overcharging and overdischarging said battery consisting of circuit-operating devices operated by a reversible current-actuated motor, and means for varying the speed of the armature of said motor, as it rotates in one or the other direction, substantially as described.

11. An electric circuit containing one or a number of translating devices, a dynamo and two storage batteries connected in series, means for connecting either said dynamo or storage batteries with said circuit to supply current for operating the translating devices, and means for connecting said storage batteries in parallel with said dynamo when disconnected from the circuit containing the translating devices, means for preventing overcharging said storage batteries consisting of a circuit-operating device, an electric motor for operating it and means for connecting the field-magnets of said motor with the storage-battery circuit and with the dynamo-circuit in such manner that the current passes through said field-magnets in one direction when passing from the dynamo to said storage batteries and in the opposite direction when passing from the storage batteries to the translating devices, substantially as described.

12. An electric circuit containing one or a number of translating devices, a dynamo and two storage batteries connected in series, means for connecting either said dynamo or storage batteries with said circuit to supply current for operating the translating devices, and means for connecting said storage batteries in parallel with said dynamo when disconnected from the circuit containing the translating devices, means for preventing overcharging and overdischarging said storage batteries consisting of circuit-operating devices, an electric motor for operating them, and means for connecting the field-magnets of said motor with the storage-battery circuit and the dynamo-circuit in such manner that the current passes through said field-magnets in one direction when passing from said dynamo to said storage batteries and in the opposite direction when passing from the storage batteries to the translating devices, substantially as described.

13. An electric circuit containing one or a number of translating devices, a dynamo and two storage batteries connected in series, means for connecting either said dynamo or storage batteries with said circuit to supply current for operating the translating devices, and means for connecting said storage batteries in parallel with said dynamo when disconnected from the circuit containing the translating devices, means for preventing overcharging and overdischarging said storage batteries consisting of circuit-operating devices, an electric motor for operating them, and means for connecting the field-magnets of said motor with the storage-battery circuit and the dynamo-circuit in such manner that the current passes through said field-magnets in one direction when passing from said dynamo to said storage batteries and in the opposite direction when passing from the storage batteries to the translating devices, and means for varying the speed of the armature of said motor as it rotates in opposite directions.

In testimony whereof I have signed my name to this specification in the presence of two subscribing witnesses.

JOHN H. BICKFORD.

Witnesses:
    B. J. NOYES,
    J. L. HUTCHINSON.